No. 775,768. PATENTED NOV. 22, 1904.
W. B. COWLES.
APPARATUS FOR OPERATING ARMORED HATCHES, TRAP DOORS,
OR THE LIKE.
APPLICATION FILED JULY 25, 1904.
NO MODEL. 5 SHEETS—SHEET 1.
Fig. 1.
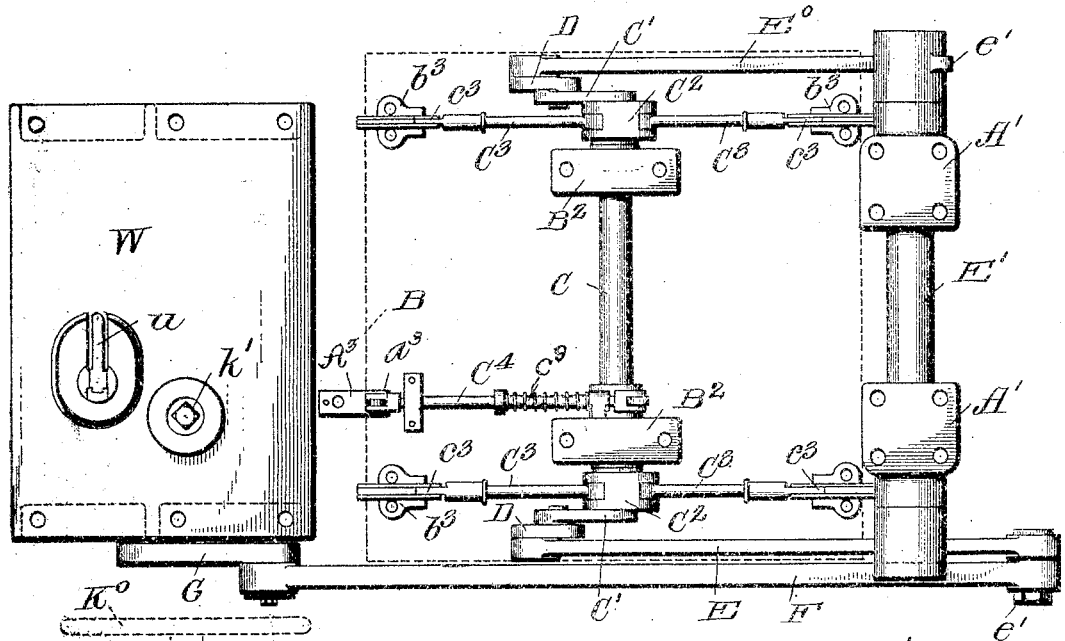
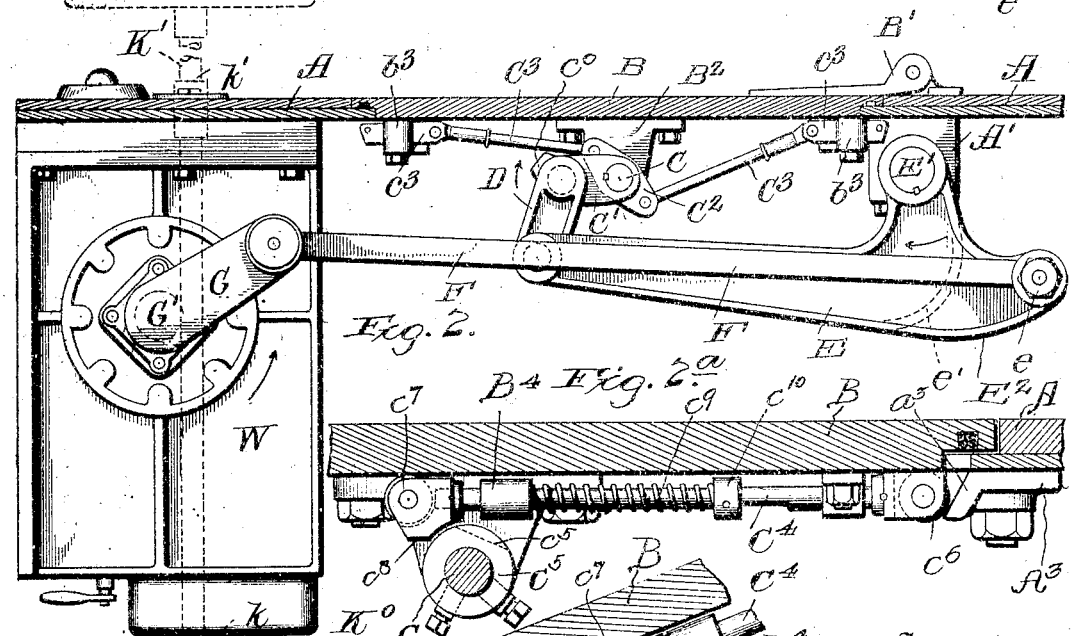
Fig. 2.
Fig. 2ª.
Fig. 2ᵇ.
Witnesses
Inventor
W. B. Cowles,
by Wilkinson & Fisher,
Attorneys.

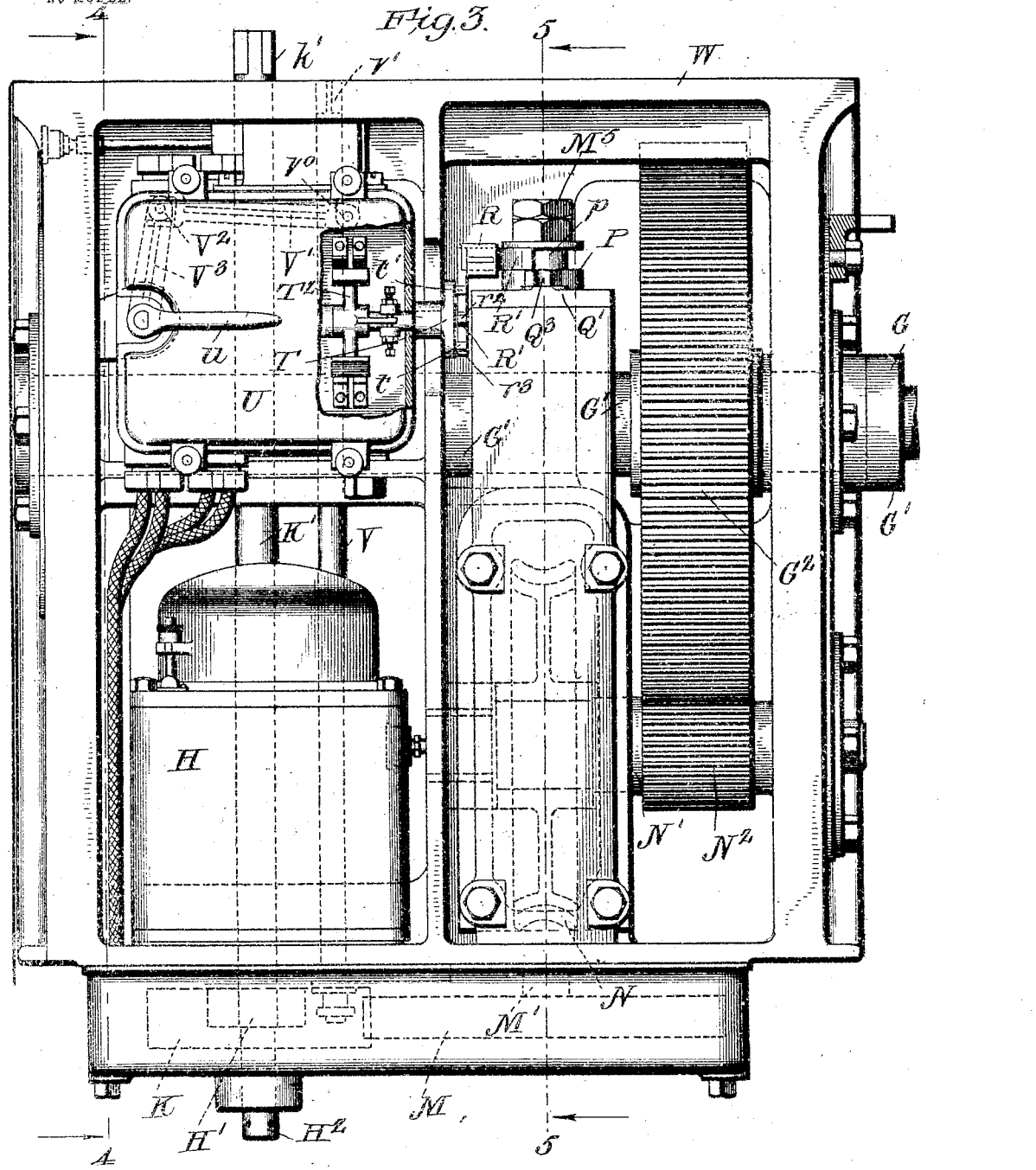

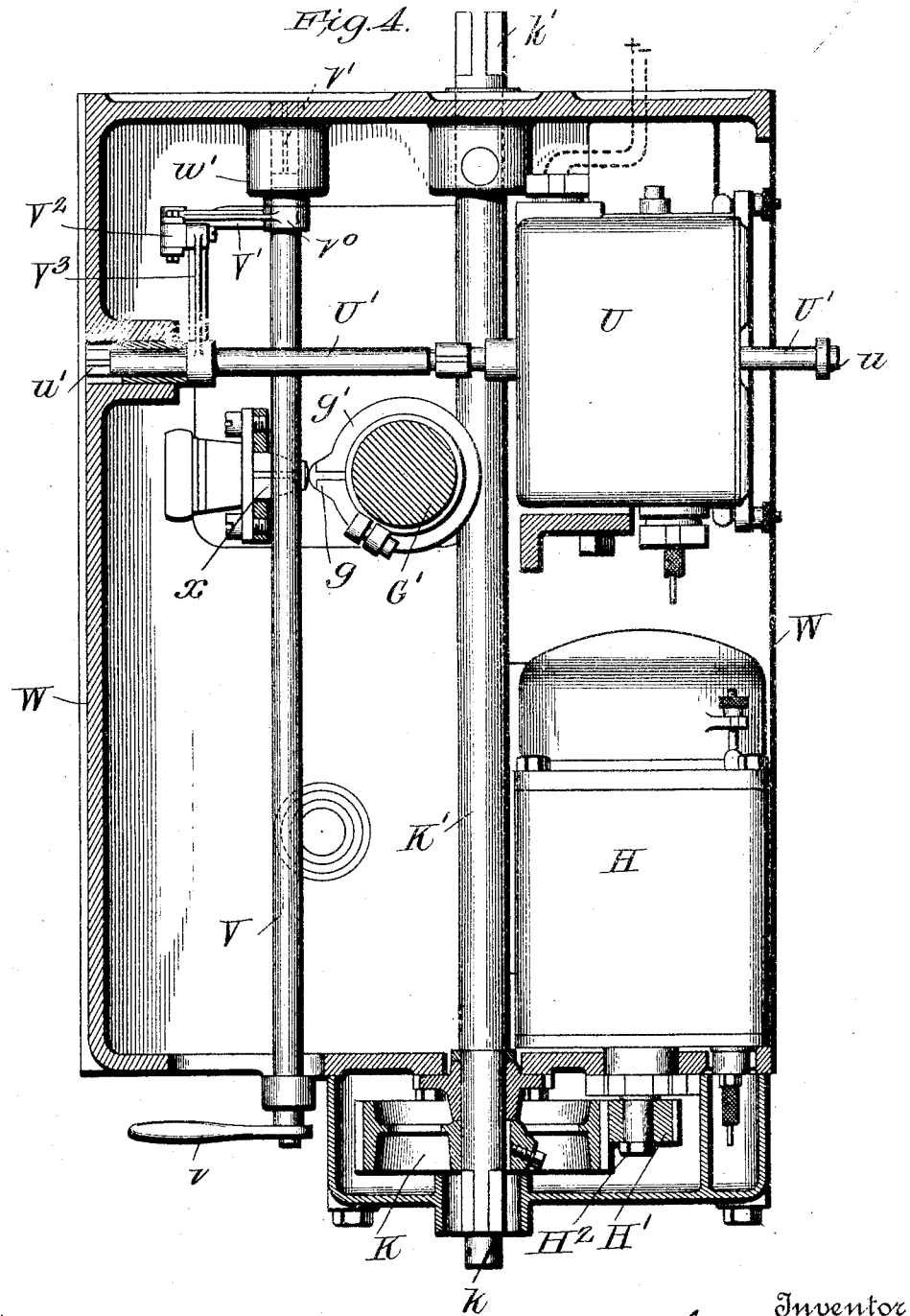

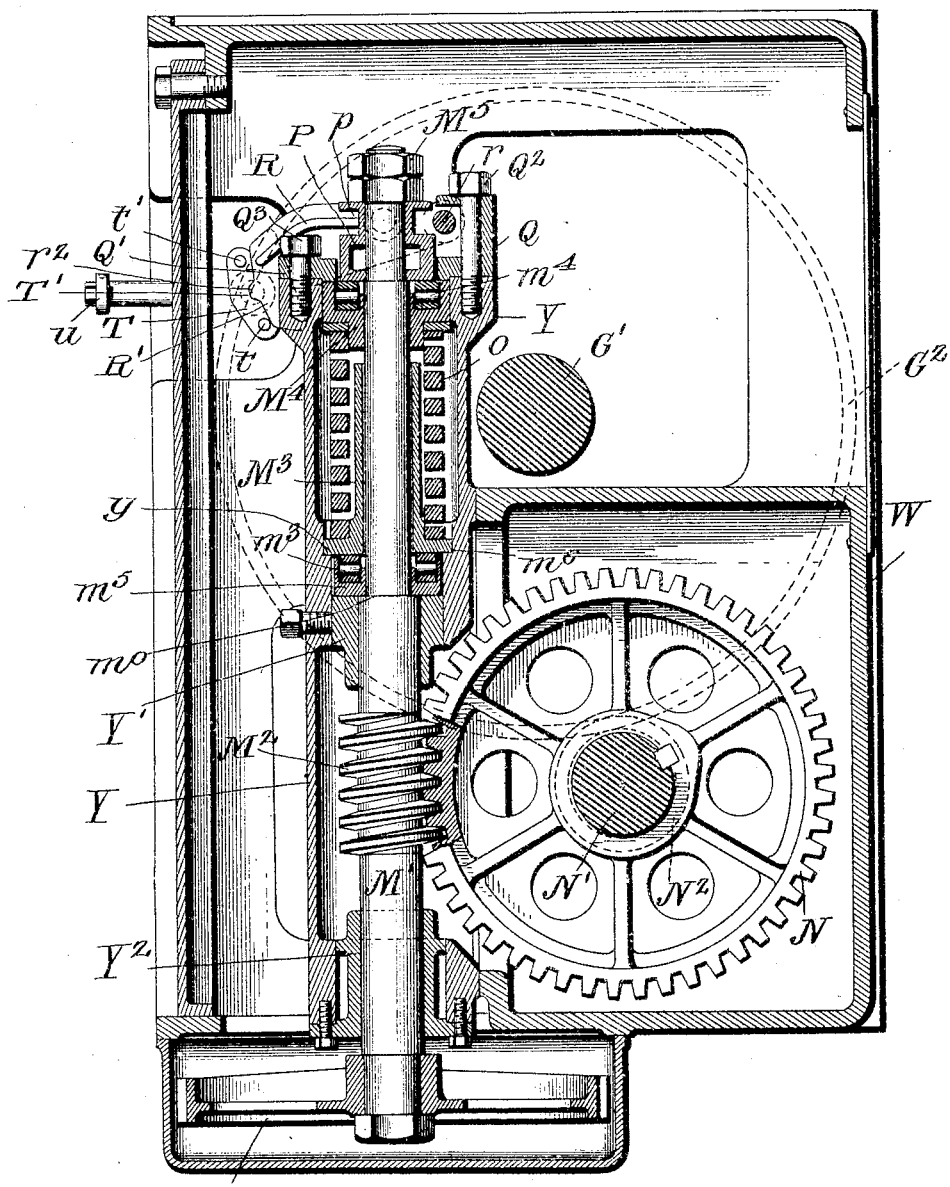

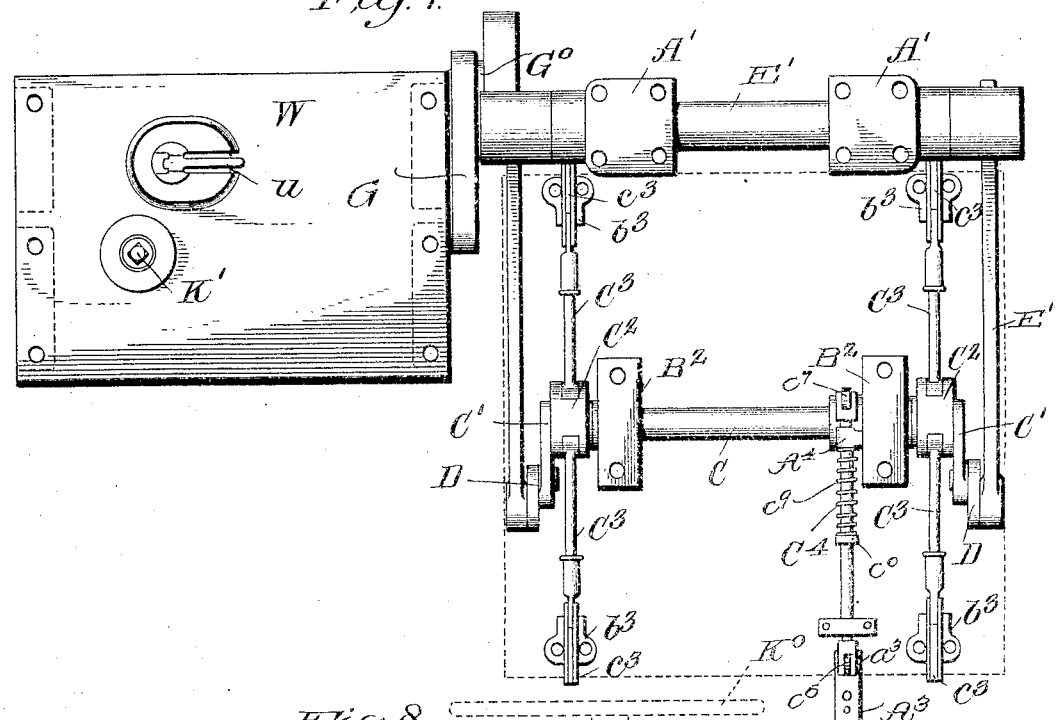

No. 775,768.                                                                                                    Patented November 22, 1904.

UNITED STATES PATENT OFFICE.

WILLIAM BARNUM COWLES, OF CLEVELAND, OHIO, ASSIGNOR TO THE "LONG ARM" SYSTEM COMPANY, OF CLEVELAND, OHIO, A CORPORATION OF OHIO.

APPARATUS FOR OPERATING ARMORED HATCHES, TRAP-DOORS, OR THE LIKE.

SPECIFICATION forming part of Letters Patent No. 775,768, dated November 22, 1904.

Application filed July 25, 1904. Serial No. 218,151. (No model.)

*To all whom it may concern:*

Be it known that I, WILLIAM BARNUM COWLES, a citizen of the United States, residing at Cleveland, in the county of Cuyahoga and State of Ohio, have invented certain new and useful Improvements in Apparatus for Operating Armored Hatches, Trap-Doors, or the Like; and I do hereby declare the following to be a full, clear, and exact description of the invention, such as will enable others skilled in the art to which it appertains to make and use the same.

My invention relates to electrically-operated mechanism for operating armored hatches or for swinging heavy doors or other barriers where considerable force is required.

My invention also relates to improved means for automatically locking said hatches in the closed position and for releasing same when desired.

My invention will be understood by reference to the accompanying drawings, in which the same parts are indicated by the same letters throughout the several views.

Figure 1 is a plan view of the mechanism, the deck and hatch being omitted and the outline of the hatch being shown in dotted lines. Fig. 2 is an end view of the device shown in Fig. 1, the hatch-plate and deck being shown in section. Figs. $2^a$ and $2^b$ are details showing the operation of the device for preventing the hatch from oscillating during the opening and closing thereof, thus prematurely operating the tighteners. Fig. 3 shows the case for the electric motor and gearing as removed from the deck and shows the contents thereof, the drawing being made on a larger scale than Figs. 1 and 2. Fig. 4 shows a section along the line 4 4 of Fig. 3 and looking in the direction of the arrows. Fig. 5 shows a section along the line 5 5 of Fig. 3 and looking in the direction of the arrows. Fig. 6 is a detail showing the arm for operating the limit-switch and the yoke operated thereby. Fig. 7 is a plan view of a modified form of the apparatus, the deck and hatch being omitted and the outline of the hatch being indicated in dotted lines. Fig. 8 is an end view as seen from the right of Fig. 7, the parts being shown on a larger scale and the hatch and deck being shown in section.

A represents the deck or floor, and B the hatch or trap-door, which is to be swung upward about hinges B'.

A' and $B^2$ are shaft-hangers secured to the deck and the hatch, respectively.

C is a rock-shaft mounted in the hangers $B^2$ and carrying the yokes $C^2$, to which are connected the rods $C^3$, carrying the tightening-wedges $c^3$, which pass through lugs $b^3$ on the hatch-plate B and project beneath the edges of the plate A. The shaft C is rocked by means of the crank C', connected by the link D to the lever E, which is pivoted on the shaft E', supported by the hangers A'. This lever E is provided with an arm $E^2$, to which is pivoted at $e$ the connecting-rod F, driven by the crank G on the shaft G'. The opposite end of the shaft E' has a lever $E^0$ secured thereto, which is of substantially similar construction to the lever E except that the arm $E^2$ is omitted, the contour of the lever being indicated by dotted lines at $e'$ in Fig. 2. This lever E' is connected by a link D and the crank C' to the shaft C.

In the modifications shown in Figs. 7 and 8 the crank G is provided with a roller $g^0$ on the crank-pin $G^0$, which roller travels up and down in the groove $e^3$, in the arm $E^3$, fast on the shaft E', to which shaft the lever $E^2$ is secured, and this arm $E^3$ rocks the shaft E' and operates the yokes $C^2$ and locking-bars $C^3$, as already indicated with reference to Figs. 1 and 2. Instead of having simple wedges or shoes $c^3$, as shown in Figs. 1 and 2, rollers $c^4$ may be added to diminish friction, as shown in Fig. 8. The operation of the apparatus shown in Figs. 7 and 8 is otherwise the same as has already been described with reference to the apparatus indicated in Figs. 1 and 2.

It will be seen from inspection of Figs. 1, 2, 7, and 8 that if the crank G be moved in the direction of the arrow the shaft E' and also the shaft C will be turned in the direction of the arrows, causing the yokes $C^2$ to withdraw the locking-bars $C^3$, at the same time bringing the stop $c^9$ into engagement with the under side of the hatch-plate B. The locking-bars $C^3$ being withdrawn, the hatch is now swung upward about its hinges B' to the open position. To steady the hatch while it is being swung about its hinges and to prevent the premature projection of the locking-bars $C^3$ in the operation of closing the hatch, I provide the locking mechanism illustrated in detail in Figs. 2$^a$ and 2$^b$, in which $C^4$ represents the bolt, which is normally thrust away from the sleeve B', which is fast to the hatch-plate by means of the spring $c^9$, which presses against the set-collar $c^{10}$ on the bar $C^4$. The front end of this bar carries a roller $c^6$, which engages the inclined face $a^3$ on the lug $A^3$, fast to the deck. The other end of the bar carries a block $c^7$, having an antifriction-roller journaled therein and also having a lug $c^8$, provided with a flat face, which lug registers with the slot $c^5$ in the collar $C^5$, fast on the shaft C.

It will be seen that when the shaft C is rocked to the position for opening the hatch the slot $c^5$ in the collar $C^5$ will be substantially parallel to the base of the hatch-plate, and as the hatch-plate begins to swing upward about its hinges the roller $c^6$, under the influence of the spring $c^9$, will ride upward and outward along the inclined face $a^3$ until the lug $c^8$ passes into the slot $c^5$, as shown in Fig. 2$^b$. In this position the shaft C will be locked against rotation in either direction and the whole system will swing about the hinges B' of the hatch. Thus the locking-bars $C^3$ will be held in the withdrawn position from the moment that the hatch swings clear of its seat until it is just about to swing down on its seat again. When the hatch is swung downward toward the closing position, the roller $c^6$ will restore the bar $c^4$ to the position shown in Fig. 2$^a$, withdrawing the lug $c^8$ from engagement with the slot $c^5$ and allowing the shaft C to be rocked in the reverse direction, thus operating the locking-bars $C^3$. These locking-bars serve not only to lock the hatch on its seat, but also to make a substantially water-tight and air-tight joint when the hatch is in the closed and locked position.

H represents the electric motor, having a pinion H' on its armature-shaft H$^2$. This pinion meshes with the gear K on the shaft K', (see Fig. 4,) and this gear K also meshes with the spur-wheel M on the shaft M', which shaft carries the worm M$^2$, meshing with the worm-wheel N on the shaft N'. This shaft N' carries the pinion N$^2$, (see Figs. 3 and 5,) which meshes with the spur-wheel G$^2$ on the shaft G'. Thus it will be seen that the shaft G', and with it the crank G, may be rotated by means of the electric motor H.

In order to turn the shaft G' by hand from either side of the deck, if desired, I provide angular ends $k$ and $k'$ on the shaft K', one projecting above the deck and the other projecting below the casing, as shown in Figs. 2 and 4, whereby the shaft K' may be turned by a hand-crank or by a hand-wheel K$^0$, (see Fig. 2,) if desired.

The system of levers and connections for operating the hatch-plate is so arranged that when the parts are in the closed position the lug $g$ on the collar $g'$, fast on the shaft G', will press against the button $x$, as shown in Fig. 4, thereby automatically cutting off the current when the hatch is closed and locked.

Since in the operation of heavy hatch-plates or the like by means of power-operated gearing unusual strains are occasionally encountered which might be liable to injure the mechanism or burn out the electric motor where such is used for driving the mechanism, it becomes important to provide automatic mechanism by which when the load becomes excessive the operating mechanism may be controlled or thrown out of operation. I find it most convenient to provide an automatic cut-out for cutting off the electric current when the load becomes excessive, which will now be described.

The shaft M' rotates between fixed journal-bearings Y' and Y$^2$, fast in the casing Y. This shaft has a slight longitudinal play in said bearings and is shouldered, as at $m^9$, to bear against the collar $m^5$, carrying the roller-bearing $m^3$ for the sleeve M$^3$. This sleeve M$^3$ has a flange $m^6$, which engages the shoulder $y$ of the casing Y, and thus limits the downward travel of said sleeve. The spring O is held under compression between the sleeves M$^3$ and M$^4$ on the shaft M'. The sleeve M$^4$ carries the roller-bearings $m^4$ beneath the collar P, which is secured on the shaft M' by means of the lock-nuts M$^5$. The sleeve P is provided with an annular groove $p$ to receive the yoke R', which is pivoted, as at $r'$, to the arm R, which arm is pivoted at $r$ in the cap-piece Q, secured by means of the bolts Q$^2$ and Q$^3$ to the casing Y. The free end R$^2$ of the arm R is provided with the lug $r^2$ and inclined faces $r^3$, which lug is normally held midway between the studs $t$ and $t'$ on the yoke T, which is fast to the rock-shaft T', connected to the cut-out switch T$^2$, preferably mounted in the same case U with the controller. It will be seen that should the load on the motor become great enough to cause the reaction of the worm-wheel N to push the shaft M' up or down against the action of the spring O the arm R will be rocked, causing the lug $r^2$ to strike one or the other of the lugs $t$ or $t'$ and rocking the shaft T', thus operating the cut-out switch T$^2$. The compression of the spring should be adjusted to cause the cut-out to act when any predetermined load is put on the motor. The load on the motor will become excessive should any obstruction prevent either the opening or the closing of the hatch or should the parts stick for any cause—as, for instance, from the breaking of one of the locking-bars C$^3$. Whenever the load does become excessive, the automatic cut-out will operate, cutting off the current from the motor. The current will remain cut off until either the obstruction is removed, when the spring O will return the cut-out switch to the initial position, or until the current is turned onto the motor in the reverse direction. It will be seen that this automatic cut-out will operate irrespective of whether the excessive load occur in either opening or closing the hatch.

I provide means for either starting or stopping the electric motor or a series of such motors from a distance, which means are described in my application Serial No. 216,142, filed July 11, 1904, and entitled "Electric system for operating bulkhead doors, hatches, &c.," and I also provide means for turning the current on and off the motor locally at the hatch, which will now be described.

U represents the casing containing the controller of any ordinary or satisfactory type, which controller is operated by turning the shaft U' either from above the deck or from below the casing W or from either side of the said casing, as will now be described. Each end of the shaft U' is adapted, as at $u'$, to receive a handle, one of which, $u$, is shown to the right of Fig. 4, and thus the said shaft can be turned from either side of the casing W. To turn the said shaft U' from the deck or from below the casing, I provide a vertical shaft V, having a squared head $v'$ projecting into the socket $w'$, which squared end may be reached by a wrench or handle from the deck. On the lower end of the said shaft V, I provide a handle $v$. This shaft V carries the crank V', connected by the link $V^2$ to the crank $V^3$ on the shaft U', and thus turning the shaft V will turn the shaft U' through a limited angle, and thus will operate the controller. Thus it will be seen that the controller may be operated either from above the deck or from below the casing W or from either side of said casing.

It will be obvious that various modifications may be made in the herein-described apparatus, which could be used without departing from the spirit of my invention.

Having thus described my invention, what I claim, and desire to secure by Letters Patent of the United States, is—

1. In a mechanism for operating hatches, trap-doors, or the like, the combination with a deck or floor and a hatch hinged thereto, of mechanism for swinging said hatch about its hinges, an electric motor for operating said mechanism, and an automatic cut-out for cutting the current from said electric motor when the load thereon exceeds a predetermined limit, substantially as described.

2. In a mechanism for operating hatches, trap-doors, or the like, the combination with a deck or floor, and a hatch hinged thereto, of mechanism for swinging said hatch about its hinges, an electric motor for operating said mechanism, and an automatic cut-out for cutting the current from said electric motor when the load thereon exceeds a predetermined limit, comprising a spring under compression, means operated by the mechanism for compressing said spring when the load becomes excessive, and a cut-out switch operated by compression of said spring, substantially as described.

3. In a mechanism for operating hatches, trap-doors or the like, the combination with a deck or floor, and a hatch hinged thereto, of mechanism for swinging said hatch about its hinges, an electric motor for operating said mechanism, a spring under compression, means automatically operated to compress said spring when the load on the motor becomes excessive, and a cut-out switch automatically operated by the compression of said spring, whereby the current is cut off from the motor when the load becomes excessive, substantially as described.

4. In a mechanism of the character described, the combination with a deck or floor and a hatch hinged thereto, of a bell-crank lever pivoted to the deck or floor and connected to the hatch, an electric motor and mechanism driven thereby for operating said bell-crank lever, and means for automatically cutting off the current from said motor when the load thereon exceeds a predetermined limit, substantially as described.

5. In a mechanism of the character described, the combination with a deck or floor and a hatch hinged thereto, of a bell-crank lever pivoted to the deck or floor and connected to the hatch, an electric motor and mechanism driven thereby for operating said bell-crank lever, and a cut-out switch with automatic means for operating the same when the load on the motor exceeds a predetermined limit, substantially as described.

6. In a mechanism of the character described, the combination with a deck or floor and a hatch hinged thereto, of a bell-crank lever pivoted to the deck or floor and connected to the hatch, an electric motor and mechanism driven thereby for operating said bell-crank lever, a spring under compression, means automatically operated to compress said spring when the load on the motor exceeds a predetermined limit, and a cut-out switch automatically operated by the compression of said spring, substantially as described.

7. In a mechanism of the character described, the combination with a deck or floor and a hatch hinged thereto, of a bell-crank lever pivoted to the deck or floor and connected to the hatch, an electric motor and mechanism driven thereby for operating said bell-crank lever, and means for automatically cutting off the current from said motor when the load thereon exceeds a predetermined limit, with means for automatically locking the hatch on its seat in closing, and automatically unlocking the same in opening, substantially as described.

8. In a mechanism of the character described, the combination with a deck or floor and a hatch hinged thereto, of a bell-crank lever pivoted to the deck or floor and connected to the hatch, an electric motor and mechanism driven thereby for operating said bell-crank lever, and a cut-out switch with automatic means for operating the same when the load on the motor exceeds a predetermined limit, with means for automatically locking the hatch on its seat in closing, and automatically unlocking the same in opening, substantially as described.

9. In a mechanism of the character described, the combination with a deck or floor and a hatch hinged thereto, of a bell-crank lever pivoted to the deck or floor and connected to the hatch, an electric motor and mechanism driven thereby for operating said bell-crank lever, a spring under compression, means automatically operated to compress said spring when the load on the motor exceeds a predetermined limit, and a cut-out switch automatically operated by the compression of said spring, with means for automatically locking the hatch on its seat in closing, and automatically unlocking the same in opening, substantially as described.

10. In a mechanism of the character described, the combination with a deck or floor and a hatch hinged thereto, of a bell-crank lever pivoted to the deck or floor and connected to the hatch, an electric motor and mechanism driven thereby for operating said bell-crank lever, and means for automatically cutting off the current from said motor when the load thereon exceeds a predetermined limit, with means for automatically locking the hatch on its seat in closing, and automatically unlocking the same in opening, and means for automatically locking said locking means except when the hatch nearly reaches the closed position, substantially as described.

11. In a mechanism of the character described, the combination with a deck or floor and a hatch hinged thereto, of a bell-crank lever pivoted to the deck or floor and connected to the hatch, an electric motor and mechanism driven thereby for operating said bell-crank lever, and a cut-out switch with automatic means for operating the same when the load on the motor exceeds a predetermined limit, with means for automatically locking the hatch on its seat in closing, and automatically unlocking the same in opening, and means for automatically locking said locking means except when the hatch nearly reaches the closed position, substantially as described.

12. In a mechanism of the character described, the combination with a deck or floor and a hatch hinged thereto, of a bell-crank lever pivoted to the deck or floor and connected to the hatch, an electric motor and mechanism driven thereby for operating said bell-crank lever, a spring under compression, means automatically operated to compress said spring when the load on the motor exceeds a predetermined limit, and a cut-out switch automatically operated by the compression of said spring, with means for automatically locking the hatch on its seat in closing, and automatically unlocking the same in opening, and means for automatically locking said locking means except when the hatch nearly reaches the closed position, substantially as described.

13. In a mechanism for operating hatches, trap-doors, or the like, the combination with a deck or floor and a hatch hinged thereto, of mechanism for swinging said hatch about its hinges, comprising a train of gearing, an electric motor for operating said train of gearing, a spring under compression connected to one member of said train of gearing, and adapted to yield when the thrust on that member exceeds a predetermined limit, and a cut-out switch automatically operated by the compression of said spring, substantially as described.

14. In a mechanism for operating hatches, trap-doors, or the like, the combination with a deck or floor and a hatch hinged thereto, of mechanism for swinging said hatch about its hinges, and for automatically locking the same on its seat and unlocking same, an electric motor for operating said mechanism, and an automatic cut-out for cutting the current from said electric motor when the load thereon exceeds a predetermined limit, substantially as described.

15. In a mechanism for operating hatches, trap-doors, or the like, the combination with a deck or floor, and a hatch hinged thereto, of mechanism for swinging said hatch about its hinges, and for automatically locking the same on its seat and unlocking same, an electric motor for operating said mechanism, and an automatic cut-out for cutting the current from said electric motor when the load thereon exceeds a predetermined limit, comprising a spring under compression, means operated by the mechanism for compressing said spring when the load becomes excessive, and a cut-out switch operated by the compression of said spring, substantially as described.

16. In a mechanism for operating hatches, trap-doors or the like, the combination with a deck or floor, and hatch hinged thereto, of mechanism for swinging said hatch about its hinges, and for automatically locking the same on its seat and unlocking same, an electric motor for operating said mechanism, a spring under compression, means automatically operated to compress said spring when the load on the motor becomes excessive, and a cut-out switch automatically operated by the compression of said spring, whereby the current is cut off from the motor when the load becomes excessive, substantially as described.

17. In a mechanism for operating hatches, trap-doors, or the like, the combination with a deck or floor and a hatch hinged thereto, of mechanism for swinging said hatch about its hinges, and locking-bars automatically operated by said mechanism during the early part of the opening and the latter part of the closing movement of the hatch, an electric motor for operating said mechanism, and an automatic cut-out for cutting the current from said electric motor when the load thereon exceeds a predetermined limit, substantially as described.

18. In a mechanism for operating hatches, trap-doors, or the like, the combination with a deck or floor, and a hatch hinged thereto, of mechanism for swinging said hatch about its hinges, and locking-bars automatically operated by said mechanism during the early part of the opening and the latter part of the closing movement of the hatch, an electric motor for operating said mechanism, and an automatic cut-out for cutting the current from said electric motor when the load thereon exceeds a predetermined limit, comprising a spring under compression, means operated by the mechanism for compressing said spring when the load becomes excessive, and a cut-out switch operated by the compression of said spring, substantially as described.

19. In a mechanism for operating hatches, trap-doors or the like, the combination with a deck or floor, and a hatch hinged thereto, of mechanism for swinging said hatch about its hinges, and locking-bars automatically operated by said mechanism during the early part of the opening and the latter part of the closing movement of the hatch, an electric motor for operating said mechanism, a spring under compression, means automatically operated to compress said spring when the load on the motor becomes excessive, and a cut-out switch automatically operated by the compression of said spring, whereby the current is cut off from the motor when the load becomes excessive, substantially as described.

20. In a mechanism for operating hatches, trap-doors, or the like, the combination with a deck or floor and a hatch hinged thereto, of mechanism for swinging said hatch about its hinges, and locking-bars automatically operated by said mechanism during the early part of the opening and the latter part of the closing movement of the hatch, with means automatically operated by said mechanism for locking said locking-bars except when the hatch is on its seat, an electric motor for operating said mechanism, and an automatic cut-out for cutting the current from said electric motor when the load thereon exceeds a predetermined limit, substantially as described.

21. In a mechanism for operating hatches, trap-doors, or the like, the combination with a deck or floor, and a hatch hinged thereto, of mechanism for swinging said hatch about its hinges, and locking-bars automatically operated by said mechanism during the early part of the opening and the latter part of the closing movement of the hatch, with means automatically operated by said mechanism for locking said locking-bars except when the hatch is on its seat, an electric motor for operating said mechanism, and an automatic cut-out for cutting the current from said electric motor when the load thereon exceeds a predetermined limit, comprising a spring under compression, means operated by the mechanism for compressing said spring when the load becomes excessive, and a cut-out switch operated by the compression of said spring, substantially as described.

22. In a mechanism for operating hatches, trap-doors or the like, the combination with a deck or floor, and a hatch hinged thereto, of mechanism for swinging said hatch about its hinges, and locking-bars automatically operated by said mechanism during the early part of the opening and the latter part of the closing movement of the hatch, with means automatically operated by said mechanism for locking said locking-bars except when the hatch is on its seat, an electric motor for operating said mechanism, a spring under compression, means automatically operated to compress said spring when the load on the motor becomes excessive, and a cut-out switch automatically operated by the compression of said spring, whereby the current is cut off from the motor when the load becomes excessive, substantially as described.

23. In a system of the character described, the combination with the deck, of a hatch hinged thereto, an electric motor, and gearing driven by said motor for operating the hatch, a spring under compression connected to a part of said gearing and yielding when the load on said gearing exceeds a predetermined limit, and means controlled by the yielding of said spring for cutting off the current from said motor, substantially as described.

24. In a system of the character described, the combination with the deck, of a hatch hinged thereto, an electric motor, and gearing driven by said motor for operating the hatch, a spring under compression connected to a part of said gearing and yielding when the load on said gearing exceeds a predetermined limit, and a cut-out switch controlled by the yielding of said spring for cutting off the current from said motor, substantially as described.

25. In a system of the character described, the combination with the deck, of a hatch hinged thereto, and means for swinging said hatch about its hinges, comprising an electric motor, a longitudinally-movable shaft carrying a worm driven by said motor, gearing for swinging the hatch operated by said worm, a spring under compression normally holding said shaft against longitudinal movement but yielding when the thrust on said shaft exceeds a predetermined limit, and means operated by the movement of said shaft against the action of said spring for cutting off the current from said motor, substantially as described.

26. In a system of the character described, the combination with the deck, of a hatch hinged thereto, and means for swinging said hatch about its hinges, comprising an electric motor, a longitudinally-movable shaft carrying a worm driven by said motor, gearing for swinging the hatch operated by said worm, a spring under compression normally holding said shaft against longitudinal movement, but yielding when the thrust on said shaft exceeds a predetermined limit, and a cut-out switch operated by the movement of said shaft against the action of said spring for cutting off the current from said motor, substantially as described.

27. In a system of the character described, the combination with the deck, of a hatch hinged thereto, and means for swinging said hatch about its hinges, comprising an electric motor, a longitudinally-movable shaft carrying a worm driven by said motor, a spring under compression normally holding said shaft against longitudinal movement, but yielding when the thrust on said shaft exceeds a predetermined limit, a lever adapted to be moved by the longitudinal motion of said shaft, a rock-shaft operated by the movement of said lever, and a cut-out switch controlled by the movement of said rock-shaft, whereby the current is cut off from the motor when the load exceeds a predetermined limit, substantially as described.

28. In a mechanism for operating hatches, trap-doors, or the like, the combination with a deck or floor and a hatch hinged thereto, of mechanism for swinging said hatch about its hinges, and for automatically locking the same on its seat and unlocking same, an electric motor and gearing driven thereby for operating said mechanism, and means for automatically limiting the torque on said motor to a predetermined maximum limit, whereby said gearing and motor are automatically protected, substantially as described.

29. In a mechanism for operating hatches, trap-doors, or the like, the combination with a deck or floor and a hatch hinged thereto, of mechanism for swinging said hatch about its hinges, and locking-bars automatically operated by said mechanism during the early part of the opening and the latter part of the closing movement of the hatch, an electric motor and gearing driven thereby for operating said mechanism, and means for automatically limiting the torque on said motor to a predetermined maximum limit, whereby said gearing and motor are protected, substantially as described.

30. In mechanism for operating hatches, trap-doors, or the like, the combination with a deck or floor and a hatch hinged thereto, of mechanism for swinging said hatch about its hinges, and locking-bars automatically operated by said mechanism during the early part of the opening and the latter part of the closing movement of the hatch, with means automatically operated by said mechanism for locking said locking-bars except when the hatch is on its seat, an electric motor and gearing driven thereby for operating said mechanism, and means for automatically limiting the torque on said motor to a predetermined maximum limit, whereby said gearing and motor are automatically protected, substantially as described.

In testimony whereof I affix my signature in presence of two witnesses.

WILLIAM BARNUM COWLES.

Witnesses:
A. NUTTING,
R. F. WILLIAMS.